United States Patent [19]
Miller et al.

[11] Patent Number: 5,546,120
[45] Date of Patent: Aug. 13, 1996

[54] AUTOSTEREOSCOPIC DISPLAY SYSTEM USING SHUTTER AND BACK-TO-BACK LENTICULAR SCREEN

[75] Inventors: John L. Miller, Campbell; Douglas F. Winnek, Carmel, both of Calif.

[73] Assignee: Perceptual Images, Los Gatos, Calif.

[21] Appl. No.: 374,409

[22] Filed: Jan. 17, 1995

Related U.S. Application Data

[63] Continuation of Ser. No. 972,190, Nov. 5, 1992, abandoned.
[51] Int. Cl.⁶ .................................................. H04N 13/04
[52] U.S. Cl. ................................................................ 348/59
[58] Field of Search .................... 358/88, 89, 90, 358/91, 92, 3; 359/458; 348/59, 56, 55, 54, 51, 42

[56] References Cited

U.S. PATENT DOCUMENTS

| | | | |
|---|---|---|---|
| 3,852,524 | 12/1974 | Ando et al. | 358/91 |
| 3,858,001 | 12/1974 | Bonne | 358/92 |
| 4,078,854 | 3/1978 | Yano | 359/458 |
| 4,552,442 | 11/1985 | Street | 354/112 |
| 4,562,463 | 12/1985 | Lipton | 348/56 |
| 4,852,972 | 8/1989 | Wah Lo | 350/131 |
| 4,907,860 | 3/1990 | Noble | 358/92 |
| 4,987,487 | 1/1991 | Ichinose et al. | 358/91 |
| 5,005,117 | 4/1991 | Ikumi | 358/92 |
| 5,028,950 | 7/1991 | Fritsch | 355/22 |
| 5,049,987 | 9/1991 | Hoppenstein | 348/59 |
| 5,266,995 | 11/1993 | Quadracci et al. | 355/77 |
| 5,311,220 | 5/1994 | Eichenlaub | 348/55 |
| 5,330,799 | 7/1994 | Sandor et al. | 427/510 |
| 5,349,379 | 9/1994 | Eichenlaub | 348/54 |

*Primary Examiner*—Tommy P. Chin
*Assistant Examiner*—Bryan S. Tung
*Attorney, Agent, or Firm*—Townsend and Townsend and Crew LLP; Kenneth R. Allen

[57] ABSTRACT

A display concept designed to interface with source material from a computer, video recorder or video camera. The interface to a computer generates a series of images that are separate viewpoints of a desired scene to be viewed in three dimensions. The images are based upon a horizontal translation of viewpoints. In the case of a video camera, the interface captures video images from multiple viewpoints and delivers these images in a successive manner to a location at which they can be viewed. The camera requires a single lens and sensor instead of multiple lenses. In the video recorder case, an interface stores images from a computer or video camera and plays back images in the proper sequence for the display. A display system can also operate as a film recorder to provide hard copy, three-dimensional images. A computer, video recorder or video camera thus provides images to a surface which can be viewed and which can present two-dimensional images which are changeable into three-dimensional images. In this way, the output from a computer, video recorder or a video camera can be used to store images and to play back the images in the proper sequence for a three-dimensional display.

11 Claims, 3 Drawing Sheets

AUTOSTEREOSCOPIC DISPLAY SYSTEM USING SHUTTER AND BACK-TO-BACK LENTICULAR SCREEN

This is a continuation of application Ser. No. 07/972,190, filed Nov. 5, 1994, now abandoned.

This invention relates to systems for capturing and displaying three-dimensional images directly on the viewing surface of a monitor without the need for viewing glasses. More particularly, this invention is directed to a display concept especially designed to interface with source material from a computer, video recorder or video camera. The display concept also includes a capability of recording a hard copy three-dimensional image. The video camera interface to the display is also unique in that it requires one lens and sensor to capture multiple views of a scene.

BACKGROUND OF THE INVENTION

Three-dimensional video camera and display systems available in the marketplace are based on capturing and presenting two viewpoints to the observer. Two cameras separated by a horizontal distance are focused and converged on a scene and the signal from each camera is presented to the appropriate eye. Methods for displaying stereoscopic video information include red/green anaglyphs, liquid crystal monitor shutter and passive glasses, liquid crystal shutter glasses and virtual reality head mounted displays. There exists a technique for displaying three-dimensional images without the need for glasses. The technique was developed through photography and is known as autostereoscopic technology. The concept for autostereoscopic technology is based on using a lenticular or barrier strip grating placed over the image in order to present a multitude of viewpoints to the observer. The lenticular and grating are designed to allow only narrow bands of information of the scene to be sent to the viewer's eyes from the display. If only two viewpoints are used, the viewer must keep a rigid head position in order to prevent seeing the opposite eye's views and thus a pseudoscopic or reverse relief condition. With four views the observer has greater latitude in head position and can see the shifting of objects with a corresponding head movement. This phenomenon is very useful in determining the spatial relationship of objects and is known as motion parallax.

Constructing an autostereoscopic display would require placing a lenticular or barrier strip over a display and presenting the proper image on the display. This procedure presents many difficulties based on the inherent characteristics of the displays. The cathode ray tube (CRT) is the preferred display in the marketplace based on its capability for size, refresh speed, color gamut and cost. A lenticular or barrier strip placed over a CRT has two significant problems. The first is that the linearity of the image on the display is not consistent from the center of the screen to the corners. A control system to ensure linearity would require a complex modification. The second problem is based on the thickness of the faceplate and the fact that it is physically impossible to resolve two adjacent viewpoints of information from a close (arm's length) viewing position. Flat panel displays are being developed that will overcome the linearity and faceplate issues. The flat panel display market consists of liquid crystal displays, electroluminescent displays, plasma displays and flat CRT's. The flat panel displays with the specifications needed for autostereoscopic use are not readily available in the marketplace and may only be in the future with a significant pricing level.

A stereoscopic video camera system consists of two cameras focused and converged on objects in the scene. The two cameras, however, must be perfectly matched in the areas of brightness and focus. Furthermore, a geometric distortion based on perspective is caused by converging or pointing two cameras toward the object and viewing the scene on a single monitor. Constructing a two camera system with zoom capability must have complex focus and convergence mechanisms.

SUMMARY OF THE INVENTION

The present invention presents a display concept designed to interface with source material from a computer, video recorder or video camera. In the case of a computer, the interface to the computer display generates a series of images that are separate viewpoints of the desired scene to be viewed in three dimensions. The images are based on a horizontal translation of viewpoints. In the case of a video camera, the interface would capture video images from multiple viewpoints and deliver these images in a successive manner to a location at which they can be viewed.

The camera approach is unique in that it requires a single lens and sensor instead of multiple cameras. In the video recorder case, an interface stores images from a computer, a single video camera or multiple video cameras and plays back images in the proper sequence for the display. The display system can also operate as a film recorder to provide hard copy, three dimensional images.

The present invention is directed to the use of a computer, video recorder, video camera or cameras to provide a source of images that can be transformed from a series of two-dimensional images into a three-dimensional image. The source of images provides sequence of two-dimensional viewpoints to the display monitor mechanism which converts the images into an image that appears three-dimensional to the observer. A minimum of two viewpoints is needed for the observer to use depth perception. The use of at least four viewpoints allows the observer to use motion parallax and see a shifting of objects in the scene relative to head position.

The display concept is based on optically multiplexing the viewpoints by means of a unique optical system. The viewpoints are presented on an image generator such as a CRT and then relayed through a wide aperture optical system onto a viewing surface. Within the optical system is a shutter mechanism consisting of a horizontal linear array of liquid crystal shutters. The shutters are designed to direct the image from the CRT toward the viewing surface at a specific relative angle. The viewing surface consists of a lenticular screen facing the optical system, another facing the viewer and in between a light scattering diffuser surface. The monitor operates by displaying an image on the CRT, opening the proper shutter and repeating this procedure in a successive manner until all the viewpoints have been displayed. The function of the viewing surface is to optically combine or multiplex the proper three-dimensional image from the sequential two-dimensional views. The process occurs at a speed greater than at which flicker is noticeable which is about 30 Hz. The display described above can function as a film recorder if the diffuser and lenticular facing the viewer is replaced by a piece of film.

The single lens and sensor three-dimensional video camera is based on using a wide aperture optical system to capture the sequential views of the scene. The wide aperture optical system is designed to capture information from an angle greater than that provided by the human interocular distance. Instead of a two inch diameter lens on a conventional video camera the single lens approach may use a lens two inches high by eight inches wide. A horizontal linear liquid crystal shutter is placed within the optical system and is designed to open only certain areas of the lens. The area of the lens that is opened provides light to the sensor and correspondingly a specific viewpoint of the scene. The shutter are synchronized to the sensor and are cycled at a speed to capture multiple viewpoints without noticeable flicker. The single lens approach allows for automatic matching in the areas brightness, convergence, zooming and focusing when compared to the two camera approach.

Other objects of this invention will become apparent as the following specification progresses, reference being had to the accompanying drawings for an illustration of the invention.

DETAILED DESCRIPTION OF THE PREFERRED EMBODIMENT

Figure 1:
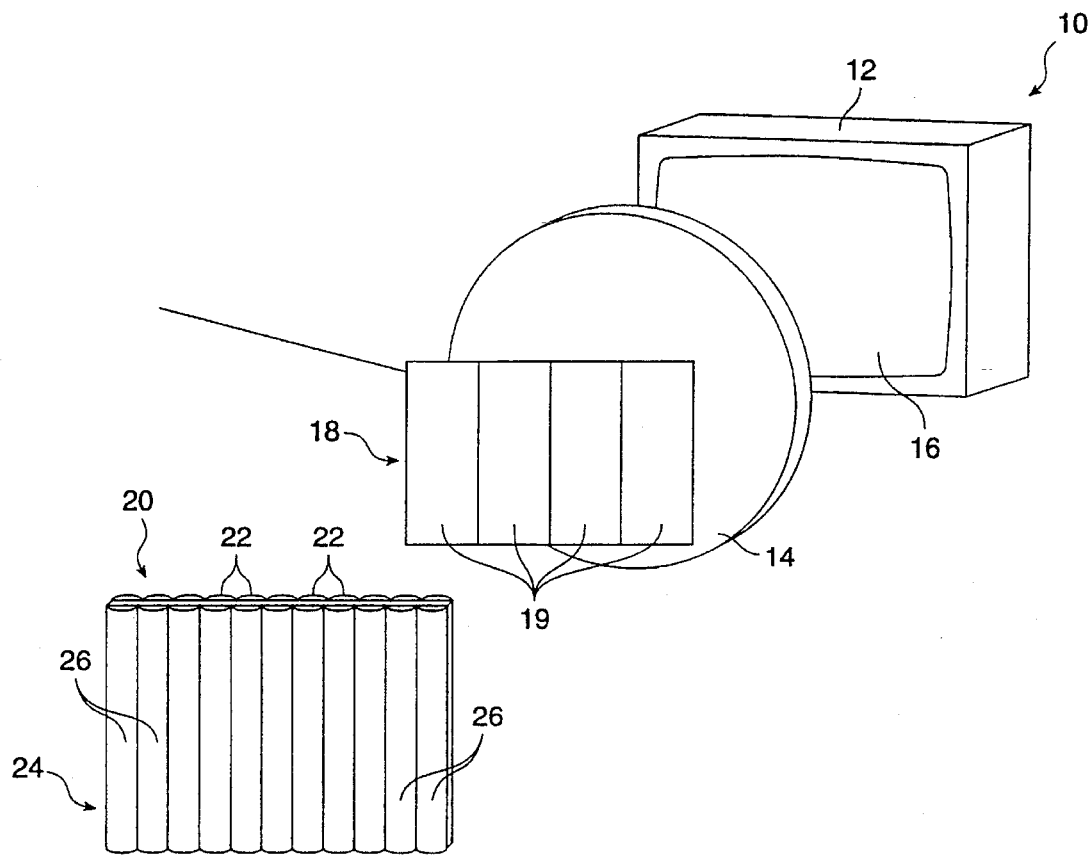
FIG. 1 is a schematic view of an image generator in the form of a CRT display for a computer, showing the lenticular structures ahead of the shutter array in front of a large diameter lens for viewing the display of the computer.

In a first embodiment of the present invention, the system 10 includes an image generator 12 including the CRT display of a computer (not shown). A large diameter lens 14 is in front of the display face 16 of the generator 12. An electronic shutter 18 is on the opposite side of the lens 14 from computer display face 16 and the shutter 18 controls the light defined by images appearing on display face 16. Shutter 18 is of linear design and has a number of consecutive, shiftable shutter elements 19 movable into respective aperture positions.

A first bank 20 of vertical lenticular devices 22 is separated from a second bank 24 of lenticular devices 26 used for viewing the lenticular views or images conveyed from the display 16 through lens 14, shutter array 18 and through bank 20 to bank 24 of lenticular viewing devices 26.

The images from the video source are displayed consecutively on a high speed image generator, such as the CRT display 12 in FIG. 1. Other possible types of image generators include flat panel displays and projection displays.

Figure 1A:
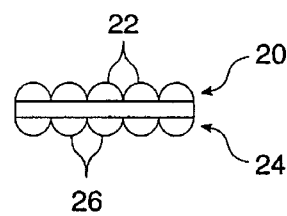
FIG. 1A is a schematic top plan view of the lenticular structure of FIG. 1.
Figure 1B:
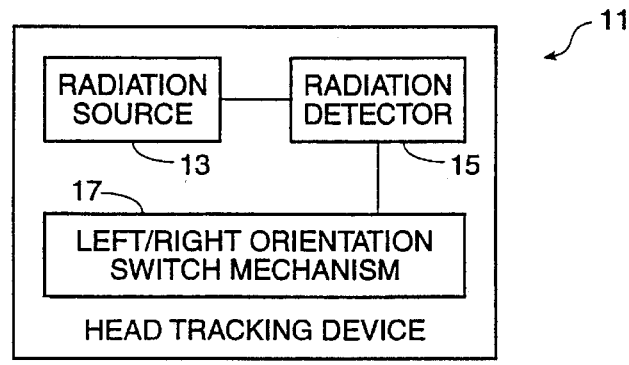
FIG. 1B is a schematic view of a head tracker used with the structure of FIG. 1.

Lens system 14 comprises a large diameter optical system. Such a system relays the CRT image onto a rear facing lenticular bank 20 (FIG. 1A). The lens elements of lens 14 comprise achromats which correct for color aberration.

The diameter of the lens 14 is similar to the diagonal of the CRT to maximize light transmission. The optical system also contains linear shutter array 18 that has consecutive elements and is positioned horizontally adjacent to the lens 14. The shutter is synchronized to the lens 14. The shutter is also synchronized to individual images from the CRT display.

The optical system directs the CRT image toward the rear facing or receiving lenticular screen bank 20. Each aspect of view from the CRT is relayed to the receiving lenticular screen at a specific angle based upon a single corresponding shutter position. A composite image is formed on the front side of the rear facing lenticular screen bank 20 based upon the series of aspect views projected through the shutter 18.

Each aspect view forms a thin vertical strip of information behind an individual composite view lenticular ridge 22 (FIG. 1). The series of aspect views is designed to completely fill the lenticular ridges 22 to form the composite view. The number of the lenses or ridges 22 or the pitch, is relatively high for the receiving lenticular screen which results in a high resolution composite image.

The other lenticular screen 24 is necessary for three-dimensional viewing of the composite image. This forwardly facing or viewing lenticular screen bank 24 is placed adjacent to the receiving screen 20. The viewing screen 24 allows for three-dimensional viewing by providing for each eye of the observer the ability to see a separate aspect view of the scene. An etched surface can be used between the lenticular screens 20 and 24 to enhance and scatter the contrast.

The use of this display technology is limited to the diameter and focal length of the optical relay system. For large screen viewing, the relay system can be replaced by individual projection units. Instead of a single display relaying a series of aspect views at specified angles, the individual projected units form a composite image on the receiving lenticular screen bank 20. The number of image sources and the focal length of the receiving lenticular screen are designed to form a composite image with a complete fill factor.

A typical application of the display system would be adapted for use with a computer graphics work station. The computer generates a series of four images at 120 degrees each. The CRT and shutter 18 operate at 120 degrees to create a complete composite image at 30 degrees. By using four viewpoints in the composite image, the viewer can see a three-dimensional image from three different head positions. This results in motion parallax or a look-around effect. By adding viewpoints in increasing display speed, the system can deliver additional viewpoints or head positions to the observer. The monitor can display a two-dimensional image by leaving all shutters open and displaying a single image at conventional speed. This technology allows for additive resolution based on temporal sampling of information. The faster the video source and CRT can display, the higher the resolution of the monitor. This technology is significant since registration is not necessary between the CRT and the viewing screen.

The display system in the first embodiment describes a three-dimensional viewing system where at least two and preferably four or more viewpoints are presented to the observer. A system with only two views requires the observer to keep a rigid head position because of the pseudoscopic or reverse-relief condition. This viewing condition occurs when the proper left/right eye images are reversed and the observer is presented with the opposite pair of images. The pseudoscopic condition occurs when the observer moves slightly to the left or right of the proper stereoscopic condition.

In order to prevent the pseudoscopic condition with a two viewpoint stereoscopic display system, a head tracking device 11 may be utilized to provide the proper viewing condition at all times. The head tracker consists of a source 13 of radiation, a radiation detector 15 and a mechanism 17 for changing left/right image orientation. The source of radiation is typically of a type that is not seen by the human eye, preferably infrared radiation. The radiation source is typically located at the display system and typically reflects the radiation from the head or body of the observer. The detector in this typical example would be located also at the display system. It is possible to locate the source and detector in various configuration including one where the source is at the display system and the detector is located behind the observer.

The function of the head tracker is to prevent the pseudoscopic viewing condition by means of detecting the observer's head position and then displaying the proper stereoscopic condition for that position. The mechanism for changing the left/right orientation is electronic or optical in nature. The electronic mechanism would require the display system to reverse the sequence of images from the image generator. Instead of a left/right image sequence with a fixed shutter sequence, the electronic mechanism would change the display to a right/left sequence once a pseudoscopic viewing condition was detected. The optical mechanism is based on keeping the same left/right image sequence and reversing the shutter sequence.

The head tracker can also function as a device to provide additional viewpoints to the observer. The additional viewpoints provide a look-around effect known as motion parallax. As the observer moves his head from side to side, the source and detector would provide head location information to another type of electronic mechanism that would provide the image generator with a different pair of images. The new images are based on the change of head position. In order to provide the additional viewpoints, this motion parallax system can receive images from a computer or camera system capable of providing the additional viewpoints. For example, a computer graphics workstation can generate new viewpoints on a timely basis and is most likely to use this type of system. However, a two-view stereoscopic video camera system or recorder cannot provide additional viewpoints unless the camera position is changed.

Figure 2:
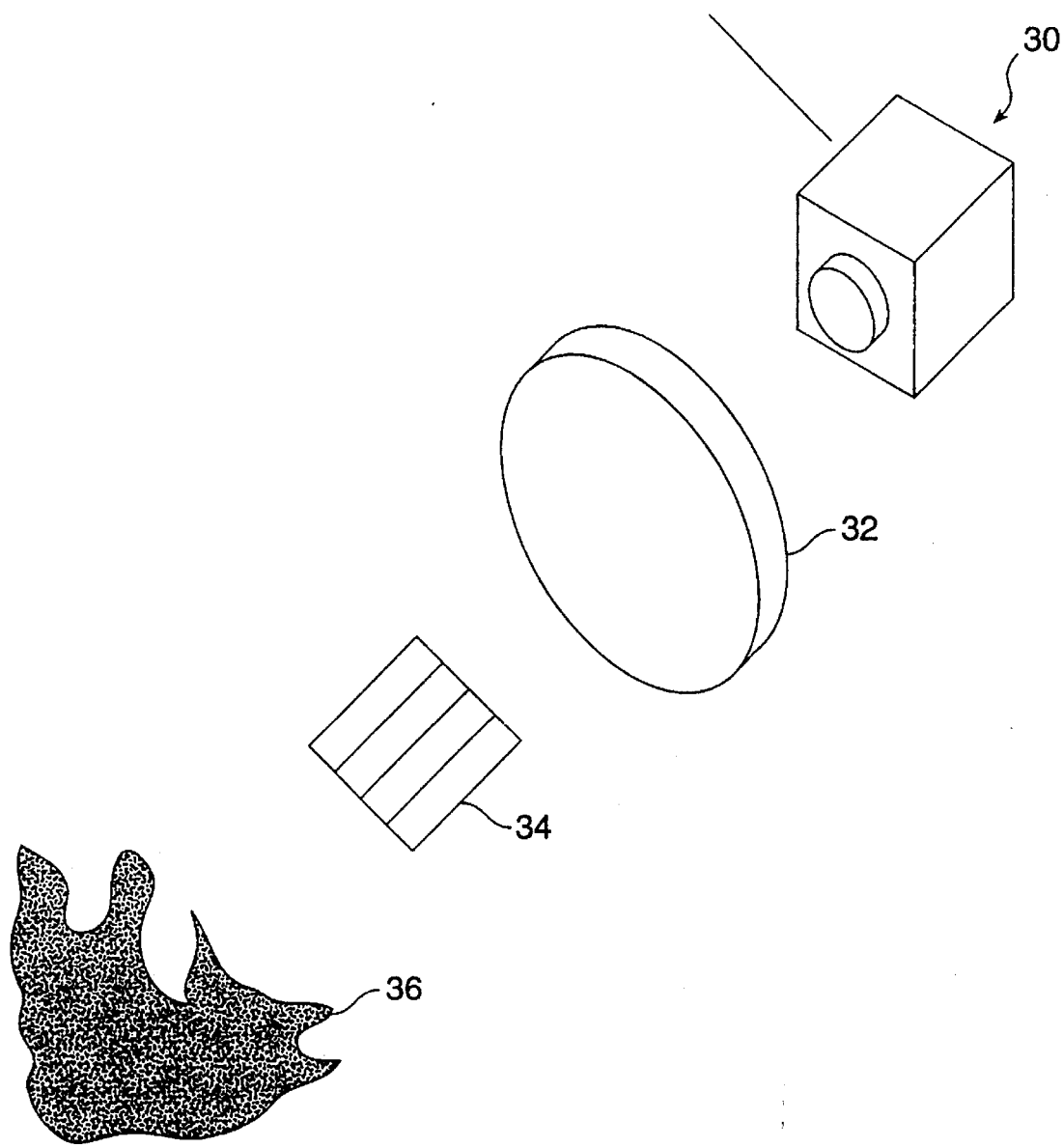
FIG. 2 is a view similar to FIG. 1 but showing a video camera with a large diameter lens, a shutter array and a subject to be viewed in three dimensions.

In FIG. 2, another arrangement of elements is shown. Such arrangement includes a video camera 30 spaced from a large diameter lens 32 adjacent to an electronic shutter array 34. The shutter array is between lens 32 and the subject 36 to be viewed by the camera.

Camera 30 can function in a manner similar to the display 12 of FIG. 1. In the FIG. 2 arrangement of elements, lens 32 and linear shutter array 34 direct individual aspect views of subject 36 to camera 30 in synchronization with the shutter. The shutter can have two positions for conventional stereoscopic imaging or more positions to form a composite image for lenticular viewing with the display 12 of FIG. 1. The speed of the camera 30 and shutter 34 is fast enough to avoid flicker or image jumping on the display 12.

Figure 3:
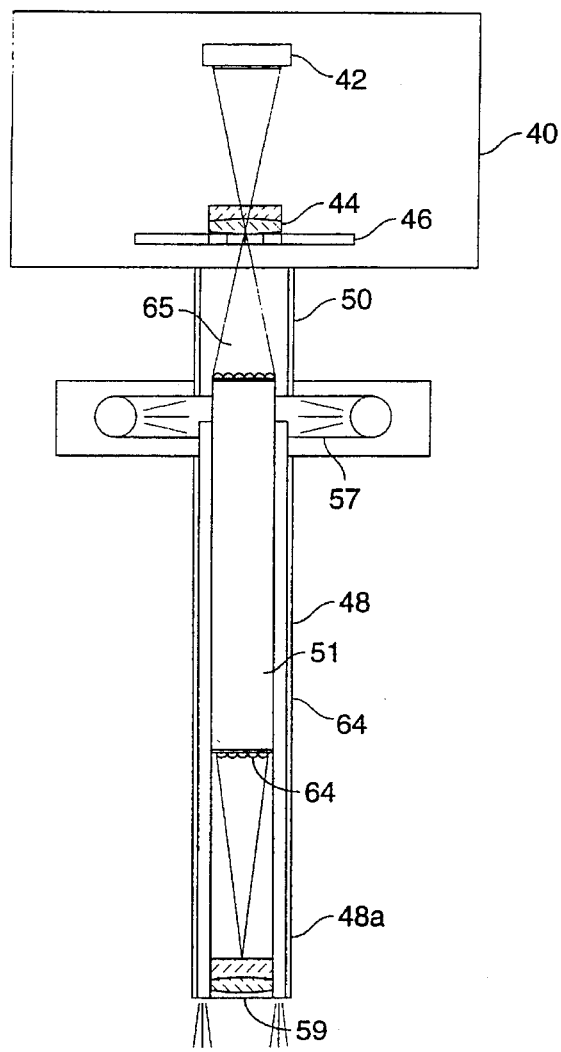
FIG. 3 is a side elevational view of a laparoscope having a lenticular structure at one end thereof.

Both shutter 34 and camera 30 can be used with a fiberoptic image tube. The shutter can be placed directly ahead of the main lens or adjacent to the main lens system. In order to move the shutter within the video camera lens, both fiberoptic ends require a lenticular screen as shown in FIG. 3 to capture and then project the multiple aspect of use of the subject 36. This system transmits the parallax of the scene or subject 36 to a convenient position for the shutter and camera.

In FIG. 3, a video camera 40 having a CCD chip 42 is spaced from a large diameter lens 44 and a shutter array 46 which is aligned optically with a laparoscope tube 48 having a shortened tube 50 extending to the video camera 40. Camera 40 receives its information directly from laparoscope 48 whose outside diameter is approximately 11 mm.

The outer end 48a of the laparoscope tube 48 is caused to extend into the cavity of tissue of the human patient to be viewed.

Figure 5:
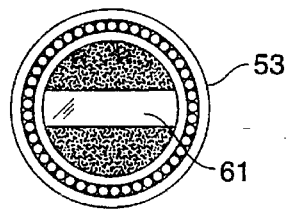

The laparoscope 48 is made up of two thin walled stainless steel tubes 49 and 51 separated by a fiberoptic sleeve 53 (FIG. 5). A ring lamp 57 is adjacent to the end of the laparoscope near video camera 40. This ring lamp transmits light forwardly through the laparoscope tube to the end having a lens system 59, namely the end 48a which is inserted into the patient. The distance of illumination is approximately 60 mm. Achromatic lens 59 is masked at the upper and lower portions of the lens (FIG. 5). This causes a rectangular, horizontal aperture lens to be created. The aperture is shown in FIG. 5 and is denoted by the numeral 61. This lens system provides a continuum of panoramic aspect views of the subject within the patient upon a 1000 line-per-inch lenticular cipher 63 which lies against the flat side against the forward end of the fiberoptic rod 51. This creates an autostereoscopic image. Such image is directed through the fiberoptic sleeve 50 to the opposite flat surface of a second 1000 line-per-inch lenticular cipher 65. The video camera lens 44 is focused upon cipher 65 and relays the corresponding image to the surface of the CCD chip 42.

Figure 4:
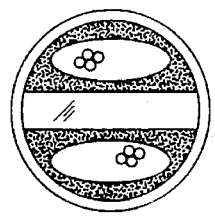
FIGS. 4 and 5 are schematic cross sectional views of the laparoscope using fiber optic cables for transmitting light.

An alternate embodiment of a fiber optics assembly is shown in FIG. 4. Bundles 53a are on opposite sides of aperture 61.

A laparoscope can be constructed without a fiberoptic image tube and a series of relay lenses are used between the main lens and video camera lens. The shutter can be placed adjacent to any of the lenses in this system.

The display system operates as a film recorder when the viewing lenticular and light-scattering surface is eliminated. Light travels from the image generator through the lens and shutters assembly toward the receiving lenticular. The receiving lenticular directs light through the film to form specific columns of information based upon the incoming angle of incidence.

We claim:

1. A system for use in displaying three-dimensional images comprising:

a source for generating and displaying optical images, said source having a single optical path for all said optical images;

a focussing lens system projecting the optical images from said source along the optical path to a three-dimensional viewing surface;

a back-to-back lenticular screen unit aligned with the optical path of the images, said back-to-back lenticular screen unit forming the three-dimensional viewing surface, said unit including a first lenticular assembly and a second lenticular assembly; and a shutter array of linear design having a plurality of consecutively configurable aperture-based shutter arrangements and located between the lenticular unit and the lens system, the shutter arrangement being adjacent the lens system and being synchronized to individual images from the source, whereby the source has an aspect view for every image displayed on the source, each aspect view from the image source being relayed from the source to the lenticular screen unit at a specific angle based upon the corresponding shutter arrangement, whereby composite images are formed on the front side of the lenticular unit.

2. A system as set forth in claim 1, wherein the generated optical images of said source come from any one of a computer, a video recorder, a single lens, a three-dimensional video camera, and multiple video cameras.

3. A system as set forth in claim 1, wherein said first lenticular assembly and said second lenticular assembly are formed of lenticules spaced apart periodically and wherein each aspect view formed by the first lenticular assembly defines a thin vertical image strip at a periodic position related to pitch of the lenticules behind an individual composite view formed by the second lenticular assembly when the same second lenticular assembly is adjacent to the first lenticular assembly, said image strips being generated in a contiguous pattern by contiguous shutter elements of Said shutter arrangement.

4. A system as set forth in claim 1, wherein the second lenticular assembly is sufficiently close to the first assembly to provide a three-dimensional viewing of a composite image formed by the first assembly.

5. A system for use in registering three-dimensional images comprising:
a source for generating and displaying optical images, said source having an optical path;
a focussing lens system projecting the optical images from said source along the optical path to a three-dimensional image surface;
a lenticular screen unit aligned with the optical path of the images, said lenticular screen unit including a lenticular assembly and a photographic emulsion forming the three-dimensional image surface, said emulsion disposed to capture said images projected into the lenticular screen unit; and
a shutter array of linear design in the optical path adjacent the lens system and having a plurality of consecutively reconfigurable aperture-based shutter arrangements, the shutter array being synchronized to individual images from the source, whereby the source has an aspect view for every image displayed on the source, each aspect view from the image source being relayed from the source to the lenticular screen unit at a specific angle based upon the corresponding shutter arrangement, whereby composite images are registered on the emulsion of the lenticular unit, wherein said emulsion is fixedly disposed relative to said shutter array, said lenticular screen unit, said focussing lens system and said source.

6. A system as set forth in claim 1, further including a head tracker synchronized to the shutter and source, said tracker being operable to utilize a pair of views and a sensor for determining the head position of a viewer to enable the viewer to see a stereoscopic image condition, the head tracker being further operable to reverse left eye/right eye orientation to prevent pseudoscopic or reverse relief viewing conditions, the head tracker being further operable to reverse the shutter position on the sequence of sequential views presented by the source, said head tracker being operable to provide more than a single left/right presentation by using additional viewpoints generated from the source to provide multiple viewpoints, said viewpoints being synchronized to the viewer's head position to allow a corresponding change in perspective as produced by the source relative to head position.

7. A system as set forth in claim 1, wherein the source includes a laparoscope having a video camera lens adjacent to the shutter array and a lenticular sheet adjacent to the ends of a fiberoptic image tube.

8. A system as set forth in claim 7, wherein said shutter array is adjacent to the lens system, the lens system being designed to transfer images toward the video camera lens and to replace the fiberoptic image of the laparoscope.

9. A system as set forth in claim 6, wherein said source includes a CRT display unit.

10. A system as set forth in claim 1, wherein the images displayed by said source are at least two in number, the shutter arrangement being operable at a sufficient rate to generate a composite image with minimal flicker, whereby by using viewpoints in the composite image, a three-dimensional image can be seen for N–1 positions where N is the number of viewpoints.

11. A system for use in displaying three-dimensional images comprising:
a source for generating and displaying optical images, said source having an optical path;
a focussing lens system projecting the optical images from said source along the optical path to a three-dimensional viewing surface;
a back-to-back lenticular screen unit aligned with the optical path of the images, said back-to-back lenticular screen unit forming the three-dimensional viewing surface, said unit including a first assembly and a second assembly;
a shutter array of linear design having a number of contiguous, aperture-based shutter elements movable into operative positions and located between the lenticular unit and the lens system, the shutter array being synchronized to individual images from the source, whereby the source has an aspect view for every image displayed on the source, each aspect view from the image source being relayed from the source to the lenticular screen unit at a specific angle based upon the corresponding shutter element position, whereby composite images are formed on the front side of the lenticular unit;
a head tracker synchronized to the shutter and source, said tracker being operable to utilize a pair of views and a sensor for determining the head position of a viewer to enable the viewer to see a stereoscopic image condition, the head tracker being further operable to reverse left eye/right eye orientation to prevent pseudoscopic or reverse relief viewing conditions, the head tracker being further operable to reverse the shutter position on the sequence of sequential views presented by the image generator, said head tracker being operable to provide more than a single left/right presentation by using additional viewpoints generated from the source to provide multiple viewpoints, said viewpoints being synchronized to the viewer's head position to allow a corresponding change in perspective relative to head position; and
wherein the images displayed by said source are four in number and cover a total included angle together of up to 120 degrees, the shutter array being operable sequentially at a sufficiently high rate to generate a composite image, whereby by using four viewpoints in the composite image, a three-dimensional image can be seen for three different viewpoint positions.

* * * * *